United States Patent
Zhang et al.

(10) Patent No.: US 6,176,148 B1
(45) Date of Patent: Jan. 23, 2001

(54) VARIABLE TOOTH WORM

(75) Inventors: Yaxiong Zhang; Lin Qi, both of Tianjin (CN)

(73) Assignee: Tianjin Everbest Gear Co., Ltd., Tianjin (CN)

( * ) Notice: Under 35 U.S.C. 154(b), the term of this patent shall be extended for 0 days.

(21) Appl. No.: 09/115,900

(22) Filed: Jul. 15, 1998

(51) Int. Cl.$^7$ ............................................ F16H 1/16
(52) U.S. Cl. ........................................ 74/425; 74/458
(58) Field of Search ................................. 74/425, 458

(56) References Cited

U.S. PATENT DOCUMENTS

| | | | |
|---|---|---|---|
| 73,095 | * 1/1868 | Harrigan et al. | 74/458 X |
| 264,428 | * 9/1882 | Albro | 74/458 |
| 493,493 | * 3/1893 | Fowler | 74/458 X |
| 3,106,103 | * 10/1963 | Smith | 74/458 |
| 3,728,907 | * 4/1973 | Stade | 74/458 X |
| 4,047,449 | * 9/1977 | Popov | 74/458 |
| 4,685,346 | * 8/1987 | Brackett | 74/427 |
| 5,605,071 | * 2/1997 | Buchanan, Jr. | 74/458 X |

FOREIGN PATENT DOCUMENTS

| | | | |
|---|---|---|---|
| 602620 | * 5/1948 | (GB) | 74/458 X |
| 513833 | * 9/1954 | (GB) | 74/458 X |
| 715462 | * 9/1954 | (GB) | 74/458 X |
| 5-196115 | 8/1993 | (JP) . | |
| 7-42813 | 2/1995 | (JP) . | |

* cited by examiner

Primary Examiner—David Fenstermacher
(74) Attorney, Agent, or Firm—Milde, Hoffberg & Macklin, LLP

(57) ABSTRACT

The present invention relates to a variable tooth worm of worm gear sets used for a gear transmission mechanism. It comprises a shaft body with thread teeth. Its tip surface is a cylinder or a crowning surface, and the reference circle of the tooth flank is a revolution of a curved line. The worm product is made with variable tooth thickness and variable tooth height. During the meshing period, its loading capacity and transmission efficiency are increased and the transmission performance approaches a more ideal state because it has a greater number of simultaneously-meshing teeth than a cylindrical worm and also gradually gets into and out of mesh. It has a lower number of simultaneously-meshing teeth than a toroidal worm during the transmission period so that it has the advantages of lower heat value, lower oil-agitating loss, lower requirements for center distance and adjustment of axial position, easier manufacture as well as better economy.

2 Claims, 1 Drawing Sheet

VARIABLE TOOTH WORM

FIELD OF THE INVENTION

The present invention relates to a component of a worm gear set used for a gear transmission mechanism.

BACKGROUND OF THE INVENTION

According to the classification of the helicoid shape of thread teeth on worm shaft bodies, the known worms in the prior art can mainly be classified as involute helicoid worms, prolate-involute helicoid worms and Archimedes worms, etc. Both the tip surface (outer envelope) and the reference circle (tooth flank) of this type of worms are a cylinder. Moreover, in recent years there appear K-form cylindrical worms and hollow flank worms, etc. They are all constructed as cylindrical worms. They have the advantages of a lower heat value (i.e., heat generated) and lower requirements for the assembly and adjustment of the center distance and axial position because of a lower number of teeth which are simultaneously meshing, but they have the disadvantages of lower loading capacity and lower transmission efficiency. Therefore, toroidal worm and worm gear transmissions have been proposed which also consist of a shaft body with thread teeth. The tip surface and reference circle of the toroidal worm are not a cylinder, but a concave circular-arc revolution which is formed by a sector of a concave circular-arc rotating around the worm axis. The tip surface therefore has a concave face as disclosed, for example, in the Japanese Patents Nos. 7-42813 and 5-196115. As compared with normal cylindrical worm transmissions, the toroidal worm transmissions have the advantages of less wear, higher transmission efficiency, more simultaneously-meshing teeth and larger loading capacity as well as the ability to bear impact loads. However, these toroidal worm transmissions have some disadvantages such as a greater meshing heat value, the requirement of a housing with a larger volume and more lubricating oil volume as well as more radiating (cooling) ribs. The service life of the associated bearings becomes shorter due to a higher oil temperature. The worm gear sets are sensitive to center distance and axial assembly position. Therefore, they require higher accuracy in center distance and axial position, thus increasing the manufacturing cost.

SUMMARY OF THE INVENTION

Therefore, a principal object of the present invention is to provide a variable tooth worm which possesses the advantages of the above two types of worms such as lower heat value, lower requirements of assembly and adjustment for center distance and axial position, larger loading capacity, higher transmission efficiency and easier manufacture as well as better economy so as to avoid the shortcomings in the prior art.

The variable tooth worm provided herein comprises a shaft body with thread teeth having a tooth flank. In accordance with the present invention, the tip surface of the teeth is a cylinder or crowning surface, while the reference circle of the tooth flank is a revolution generated by a section of curved line. With this arrangement, the worm products are available with a variable tooth thickness and variable tooth height.

Whether the tip surface of the teeth is a cylinder or a crowning surface, the teeth at two ends along the length of the variable tooth worm are the thickest and the shortest, and gradually vary towards the middle portion, where the tooth is the thinnest and the highest. The performance of the variable tooth worm according to the present invention is between that of cylindrical worms and toroidal worms. It possesses the advantages of the above two types of worms, but avoids their disadvantages.

Under the conditions of meeting with the above-mentioned structure requirements, the helicoid shape of thread teeth on the shaft body of variable tooth worms, the practical structure of other parts such as the module, starts, rotating direction and complete dimension may all be designed according to the given practical situation. They do not affect the useful performance of the variable tooth worms.

As is the case with worms in the prior art, the worm gears can be machined by using a hob corresponding to the shape of variable tooth worms.

For a full understanding of the present invention, reference should now be made to the following detailed description of the preferred embodiments of the invention as illustrated in the accompanying drawing.

DETAILED DESCRIPTION OF THE PREFERRED EMBODIMENTS

Figure 1:
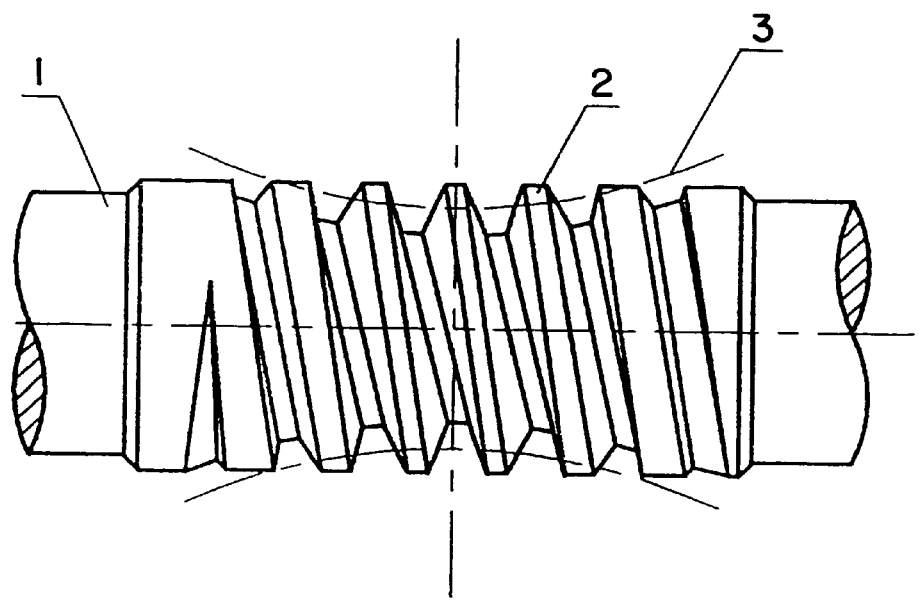
FIG. 1 is a side elevational view of a variable tooth worm with the tip surface of a cylinder.

The preferred embodiments of the present invention will now be described with reference to FIGS. 1–2 of the drawing. Identical elements in the two figures are designated with the same reference numerals.

EXAMPLE 1

As shown in FIG. 1, the variable tooth worm according to the present invention comprises a shaft body 1 with a thread tooth 2 thereon. The tip surface of the worm is a cylinder, while the reference circular surface of the tooth flank is a parabolic revolution which is formed by a sector of a parabolic rotating around the axis of the worm. Other structural elements may be determined according to the given technological situation.

Figure 2:
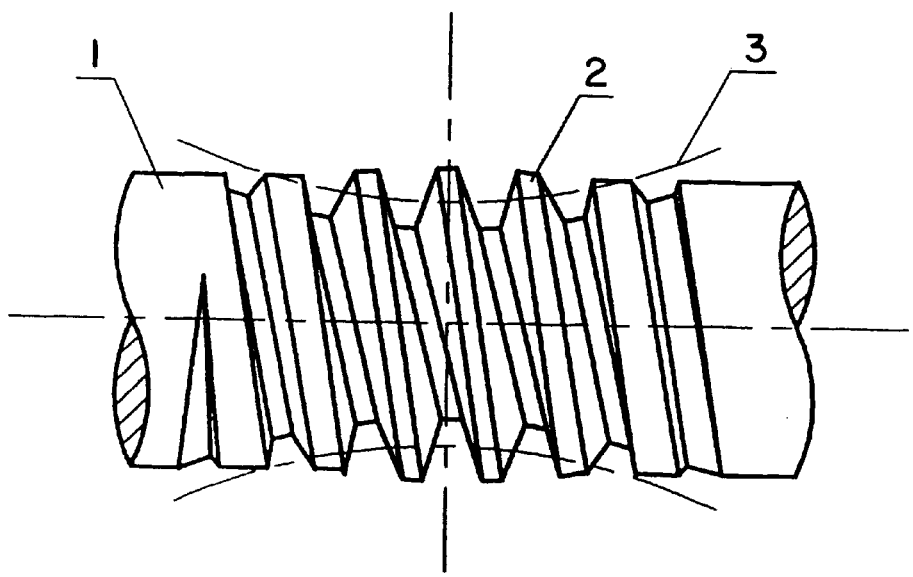
FIG. 2 is a side elevational view of another variable tooth worm with a crowning surface as its tip surface.

Alternatively, the tip surface of the variable tooth worm may also be a crowning surface (a convex surface), as shown in FIG. 2.

EXAMPLE 2

In this example, the reference circle of the tooth flank is an elliptical revolution generated by a section of an ellipse rotating around the axis of the worm; other parameters are the same as in Example 1. The variable tooth worm has its tip surface consisting of either a cylinder or a crowning surface.

EXAMPLE 3

In this example, the reference circle of the tooth flank is a hyperbolic revolution formed by a section of a hyperbola rotating around the axis of the worm; other parameters are the same as in Example 1. The variable tooth worm may have its tip surface as either a cylinder or a crowning surface.

EXAMPLE 4

In FIG. 2 there is shown a variable tooth worm with a=125 mm C.D., i=3/42 ratio, Φ62 mm maximum outer diameter.

The reference circular surface may be a circular-arc of revolution and the tip surface is crowned as may be discerned from the figure.

The tip surface of the worm of FIG. 2 can also be manufactured as a cylinder. This example is easy to manufacture and the variable tooth worm with its tip surface of a cylinder or crowning surface has improved use results.

MANUFACTURING PROCESS

The process for manufacturing the variable tooth worm comprises the steps of:

1. Firstly, mounting a blank of shaft body 1, whose outer shape is identical with the finished product, on a toroidal worm lathe, and machining it into a worm blank with thread teeth 2 according to the present invention; and;
2. Secondly, carrying out the finishing process on a CNC-controlled toroidal worm grinder with four-simultaneously-working axes or on another worm grinder to grind the teeth to the particular requirements.

As compared with the prior art, the variable tooth worm gear according to the present invention has the following advantages and results.

1. The variable tooth worm has a larger loading capacity and higher transmission efficiency and its transmission performance approaches a more ideal state because it has a greater number of simultaneously-meshing teeth than a cylindrical worm and gradually gets into and out of mesh during the transmission period.
2. The variable tooth worm has fewer simultaneously-meshing teeth and a smaller meshing portion than a toroidal worm during the transmission period, so that it has a lower heat value, lower oil-agitating loss and less sensitivity to center distance and assembly and adjustment for its axial position. In this case the corresponding housing structure, oil volume and oil temperature as well as the service life of the associated bearings are all improved. Therefore, it is easily manufactured and has better economy.

There has thus been shown and described a novel variable tooth worm which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a variable tooth worm comprising a shaft body with thread teeth thereon, said thread teeth having a tooth flank, the improvement wherein the tip surface of the variable tooth worm is a crowning surface, and wherein the reference circle of the tooth flank is a parabolic revolution.

2. In a variable tooth worm comprising a shaft body with thread teeth thereon, said thread teeth having a tooth flank, the improvement wherein the tip surface of the variable tooth worm is a cylinder, and wherein the reference circle of the tooth flank is a paabolic revolution.

* * * * *